United States Patent [19]

Kohli et al.

[11] Patent Number: 4,944,784
[45] Date of Patent: Jul. 31, 1990

[54] PROCESS FOR PREPARING A BOROSILICATE GLASS

[75] Inventors: Jeffrey T. Kohli, Alfred; James E. Shelby, Alfred Station, both of N.Y.

[73] Assignee: Alfred University, Alfred, N.Y.

[21] Appl. No.: 431,633

[22] Filed: Nov. 3, 1989

[51] Int. Cl.$^5$ .................. C03C 3/091; C03C 23/00; C03B 32/00

[52] U.S. Cl. .................. 65/32.3; 65/30.11; 501/13; 501/66

[58] Field of Search ............ 65/30.11, 32.3, 61; 501/13, 66; 313/534

[56] References Cited

U.S. PATENT DOCUMENTS

| | | | |
|---|---|---|---|
| 3,419,370 | 12/1968 | Cramer et al. | 65/30.11 X |
| 3,449,103 | 6/1969 | Stookey | 65/30.11 |
| 3,689,242 | 9/1972 | Platakis et al. | 65/32.3 |
| 3,756,798 | 9/1973 | Ernsberger | 65/32.3 X |
| 4,065,283 | 12/1977 | Asahara et al. | 65/61 X |
| 4,130,680 | 12/1978 | Ference et al. | 65/30.11 X |
| 4,240,836 | 12/1980 | Borrelli et al. | 501/13 X |
| 4,475,059 | 10/1984 | Sink | 313/534 |
| 4,613,786 | 9/1986 | Holland et al. | 65/61 X |

Primary Examiner—Robert L. Lindsay
Attorney, Agent, or Firm—Howard J. Greenwald

[57] ABSTRACT

A process for preparing a surface-darkened glass is disclosed. In the first step of the process, a specified alkali alumino-borosilicate glass which contains a minor amount of antimony trioxide is provided. Thereafter, this glass is heated to a temperature of from about 350 to about 1,000 degrees Celsius while being contacted with hydrogen-containing gas. The presence of the antimony trioxide in the glass facilitates the darkening of its surface.

20 Claims, 2 Drawing Sheets

PROCESS FOR PREPARING A BOROSILICATE GLASS

FIELD OF THE INVENTION

A process for darkening the surface of a glass composition in which an alkali aluminoborosilicate glass containing antimony ion and less than 10 parts per million of silver ion or halide ion is contacted with a hydrogen-containing gas while being heated to a temperature of at least about 350 degrees Celsius.

BACKGROUND OF THE INVENTION

It is known that glasses whose surfaces are darkened may be used to prepare many different products. Thus, for example, a surface darkened glass in the form of a disc may have its faces polished so that they transmit light through the visible region of the spectrum but have its perimeter substantially absorb such light. The lens so formed will absorb stray light near its perimeter but transmit such light near its center.

The surface darkened glass described above has conventionally been made by a process in which a clear glass core is enveloped with a dark glass cladding and both are subjected to heat and applied pressure to fuse them into a single unit. This process often produces glass objects with imperfections at the interface of the core and the cladding; and, when the surface of such a glass object is polished, pitting and other imperfections often appear at such interface.

It is an object of this invention to provide a process for preparing an integral surface darkened glass object which consists essentially of one glass which has substantially fewer imperfections than the prior art glass article, which consists of two separate glasses bonded together to form a single unit.

SUMMARY OF THE INVENTION

In accordance with this invention, there is provided a process for preparing a glass object in which a specified alkali alumino-borosilicate glass is heated to a temperature of at least about 350 degrees Celsius while being contacted with hydrogen-containing gas.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
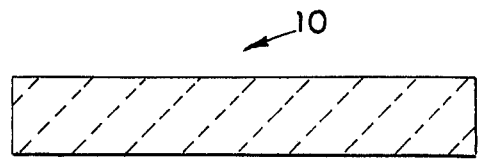
FIG. 1 is a transparent glass blank which may be used to prepare a window by a preferred process of the invention.

The process of applicants' invention produces a darkened glass, that is, a glass with one or more darkened regions whose optical absorbance throughout the ultraviolet, visible, and near-infrared regions of light spectrum is substantially higher than glass regions not treated by the process.

The glass produced by the process of the invention may be used to collimate light and produce treated apertures for cameras and scope for night vision applications, for example.

In the first step of the process of this invention, from about 0.2 to about 10.0 weight percent of anitmony ion selected from the group consisting of trivalent antimony ion, pentavalent antimony ion, and mixtures thereof, is incorporated into a silicate glass. The antimony ion is generally incorporated into glass by adding antimony trioxide to either the glass batch and/or to the glass melt. When other anitmony compound(s) are used instead of antimony trioxide, the amounts added should be adjusted so that, on an equivalent basis, from about 0.2 to about 10.0 weight percent of antimony trioxide is added. It is to be understood that, when applicants specify that they incorporate from about 0.2 to about 10.0 weight percent of anitmony ion into the glass, they are referring to the amount of antimony ion present in the glass which is derived from about 0.2 to about 10.0 weight percent of antimony trioxide, added as a batch component or to the melt.

Antimony is usually added to the glass in the form of antimony trioxide; however, other antimony compounds which decompose into antimony ions also may be used. Thus, by way of illustration, one may add antimony pentoxide, antimony tetraoxide, antimony trioxide, antimony sulfates, antimony sulfides, and the like.

The antimony trioxide (and/or the equivalent amount of other antimony compound) is often mixed with the glass-forming ingredients in a normal batching procedure; alternatively, or additionally, some or all of the antimony compound(s) may be added to the glass melt. When the batch is melted to form the glass, the antimony compound generally decomposes into a mixture of trivalent nad pentavalent antimony ions, which are incorporated into the glass. At least some to the oxygen ions which may be formed by decomposition of any antimony oxide present are often incorporated into the glass structure. It should be understood, however, that the presence of such oxygen ions in the glass is not required by the process of this invention.

Heat tends to cause the decomposition of antimony oxide into antimony ion and oxygen ion, and the antimony ion so formed usually is a mixture of trivalent- and pentavalent antimony. The amount of pentavalent antimony formed will vary with factors such as the melting atmosphere (which generally is air), the composition of the glass used, the melting temperature, and the cooling rate.

The concentration of the antimony ion in the glass may be determined by conventional means such as, e.g., wet chemical analysis, energy dispersive spectroscopy (EDS), and the like. Thus, by way of illustration and not limitation, one may use an scanning electron microscope such as, e.g., the "Autoscan Scanning Electron Microscope," serial number 52, manufactured by the ETEC Corporation, 3392 Investment Boulevard, Hayward, Calif. The measurements may be made in accordance with the "Autoscan Scanning Electron Microscope Operation and Maintenance Manual" furnished with such device, the disclosure of which is hereby incorporated by reference into this specification.

Elemental analysis of the glass may be conducted with a "PCT System 4 Plus" (or "Imagist 4000") apparatus (model 4000C, serial number 808) manufactured by Princeton Gamma-Tech (PGY) of Princeton, N.J.

It is preferred to incorporate as much antimony ion as possible into the glass. However, the amount of antimony compound which may be added is limited by the solubility of the antimony compound in the melt. It is preferred to add from about 0.2 to about 10.0 weight percent of antimony trioxide (or of an equivalent amount of other compound) to the batch and/or the melt.

When the antimony compound is added to the batch, it is preferred that substantially all of its particles be from about 0.5 to about 5.0 microns in size. It is also preferred that the other components of the batch have substantially all of their particles be from about 0.5 to about 10.0 microns in size. The batch components should be thoroughly mixed so that a homogeneous batch is produced.

When the antimony compound is added during the glass melting, it also should have substantially all of its particles be from about 0.5 to about 5.0 microns in largest dimension. The antimony compound should be thoroughly mixed in the melt so that a homogeneous melt results.

The glass composition used in the process of this invention does not contain any appreciable amount of silver ion. In general, it contains from about 0 to about 20 parts per million of silver ion and, in one preferred embodiment, less than about 10 parts per million of such silver ion.

The glass composition used in the process of this invention does not contain any appreciable amount of halide ion. As used in this specification, the term halide ion refers to ions selected from the group consisting of fluorine, chlorine, bromine, and iodine ion, or mixtures thereof. In general, the glass composition contains from about 0 to about 20 parts per million of halide ion and, in one preferred embodiment, less than about 10 parts per million of such halide ion.

Without wishing to be bound to any particular theory, applicants believe that the presence of substantial amounts of silver and/or halide ion in the glass will cause a reaction to occur which will compete with the desired darkening reaction, and a glass with the desired properties will thus not be formed.

It is preferred that the glass composition contain less than about 0.001 weight of elemental iron and/or iron ions.

The glass composition used in the process of this invention is a silicate glass. As used in this specification, a silicate glass is a glass which contains from about 40 to about 85 weight percent of silica; see, for example, column 1 of U.S. Pat. No. 3,306,833 of O'Leary, the disclosure of which is hereby incorporated by reference into this specification.

In one embodiment, the glass is a borosilicate glass containing from about 50 to about 85 weight percent of silica and from about 4 to about 26 weight percent of boron, usually added as boron oxide.

In another embodiment, the glass is an alumino-borosilicate glass containing from about 50 to about 85 weight percent of silica, from about 4 to about 26 weight percent of boron, and from about 4 to about 26 weight percent of alumina.

In yet another embodiment, the glass is an alkali alumino-borosilicate glass containing from about 50 to about 85 weight percent of silica, from about 4 to about 26 weight percent of boron, and from about 1 to about 26 weight percent of alumina, and alkali. The alkali is preferably selected from the group consisting of from about 2 to about 8 weight percent of lithia, from about 4 to about 15 weight percent of sodium oxide, from about 6 to about 20 weight percent of potassium oxide, from about 8 to about 25 weight percent of rubidium oxide, from about 10 to about 30 weight percent of cesium oxide, and mixtures thereof.

Silicate glass compositions are well known to those skilled in the art and are described in, e.g., U.S. Pat. Nos. 3,892,582, 3,920,909, 3,920,463, 4,001,019, 4,043,781, 4,118,214, 4,240,836, 4,390,635, 4,608,349, and the like. The disclosure of each of these patents is hereby incorporated by reference into this specification.

In one preferred embodiment, the glass used in the process is comprised of from about 60 to about 70 mole percent of silica, from about 15 to about 25 mole percent of boron oxide, from about 11 to about 15 mole percent of an alkali metal oxide such as potassium oxide, and from about 1 to about 5 mole percent of alumina.

The silicate glass which is comprised of from about 0.2 to about 10.0 weight percent of antimony oxide is exposed to hydrogen-containing gas at elevated temperature. The hydrogen-containing gas may be, e.g., pure hydrogen, forming gas (a mixture of hydrogen and nitrogen), and the like. It is preferred to use substantially pure hydrogen as the hydrogen-containing gas.

In one embodiment, the glass is heated while under a substantially static hydrogen atmosphere. In other embodiment, hydrogen is flowed over the glass while it is being heated in a closed vessel. In this latter embodiment, it is preferred to use a flow rate of from about 0.25 to about 10 liters per minute. In general, the glass is heated to a temperature of from about 350 to about 1,000 degrees Celsuis while being contacted with the hydrogen.

In one embodiment, where the glass treated is an alkali amino-borosilicate glass, the glass is heated to a temperature of from about 400 to about 600 degrees Celsius.

It is preferred to heat the glass to the specified temperature while contacting it with the hydrogen-containing gas for at least about 30 minutes. In one embodiment, the glass is subjected to these conditions for from about 0.5 to about 40 hours. When said alkali alumino-borosilicate glass is used in the process, the treatment time generally is from about 2 to about 30 hours.

The hydrogen treatment of the glass may be conducted under subatmospheric pressure, atmospheric pressure, or superatmospheric pressure. In one embodiment, the glass is subjected to a pressure of from about 100 to about 5,000,000 Torr and, more preferably, from about 700 to about 800 Torr.

FIG. 1 through 5 illustrate how an aperture may be made with the process of this invention.

Referring to FIG. 1, a clear glass blank 10 comprised of alkali alumino-borosilicate glass is provided. This glass is preferably similar to the borosilicate glasses of the 7000 series sold by the Corning Glass Works of Corning, N.Y., but it is comprised of about 8 weight percent of antimony trioxide. The properties of the Corning 7000 series glasses are well known to those skilled in the art and are described, e.g., on pages 1-10 and 2-2 of George W. McLellan et al.'s "Glass Engineering Handbook," Third Edition (McGraw-Hill Book Company, N.Y., 1984).

Figure 2:
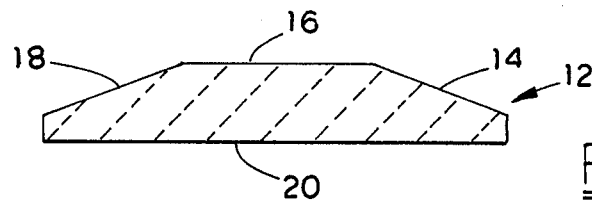
FIG. 2 is a machine ground object produced from the glass blank of FIG. 1.

Referring to FIG. 2, the glass blank 10 is ground with a bonded grinding wheel to form the wedge-shaped object of FIG. 2 which is comprised of side surface 12, tapered surface 14, top surface 16, tapered surface 18, and bottom surface 20. The blank may be ground by any of the grinding techniques known to those skilled in the art; see, e.g., page 9-3 of said McLellan book.

Figure 3:
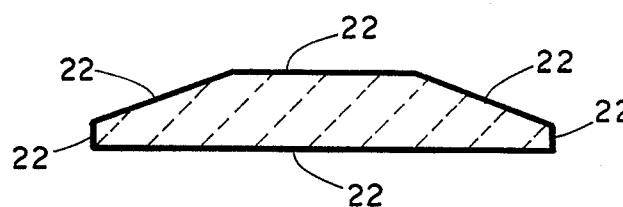
FIG. 3 is surface-darkened glass object produced from the machine ground object of FIG. 2.

The ground blank of FIG. 2 is then contacted with hydrogen gas at flow rate of 3 liters per minute while it is heated to a temperature of 600 degrees Celsius for about 10 hours. The surface-darkened glass object of FIG. 3 is thus produced. The object of FIG. 3 contains darkened surface 22, which is approximately 100 microns thick.

Figure 4:
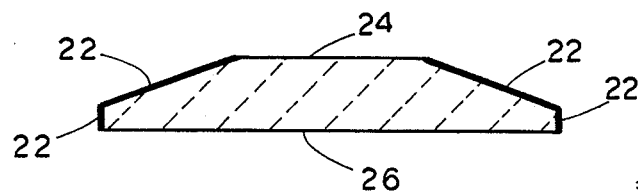
FIG. 4 is a reground glass object produced from the surface-darkened object of FIG. 3.

Referring to FIG. 4, the surface-darkened glass of FIG. 3 is ground on its top and bottom surface to produce new top surface 24, and new bottom surface 26; these ground surfaces tend to transmit light impinging upon them, whereas the remaining surfaces 22 tend to absorb it. The aperture of FIG. 4 may be used to collimate light. It should be understood that the article of FIG. 4 is thinner than the article of FIG. 3 inasmuch as a portion of the top and bottom surface have been ground away.

Figure 5:
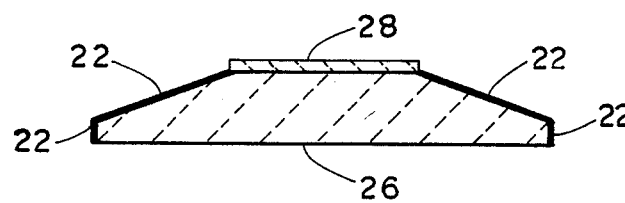
FIG. 5 is an aperture to which a gallium arsenide wafer has been bonded.

FIG. 5 illustrates a preferred embodiment in which a gallium arsenide wafer 28 is bonded to surface 24 of FIG. 4. The assembly of FIG. 5 may be used in a night-vision viewing device.

In one embodiment, the glass article produced by the process of this invention preferably consists essentially of an integral glass article with at least one optical interface but no mechanical interface. The absorbance characteristics of this glass article may be determined in accordance with the procedure illustrated in FIGS. 6 and 7.

Figure 6:
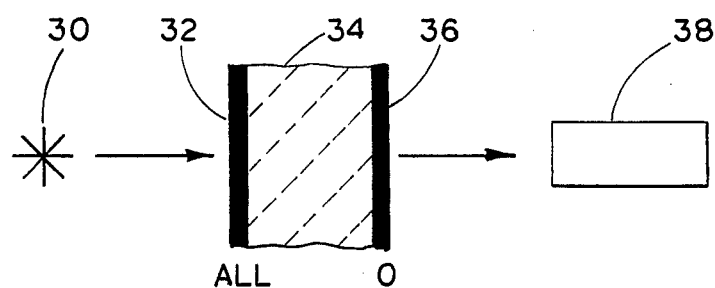
FIG. 6 is a schematic of a means for determining the absorbance characteristics of one surface-darkened article.

Referring to FIG. 6, a light source 30 is directed upon surface darkened region 32 of glass object 34. The light passing through darkened region 36 of object 34 is then measured by detector 38.

The absorbance of the object 34 (absorbance per unit sample length) is measured for object 34. A portion of darkened region 32 is then ground away, and the absorbance of the remaining object 34 is then also determined. The absorbance characteristics of the object can then be plotted as a function of width, as shown in FIG. 7.

Figure 7:
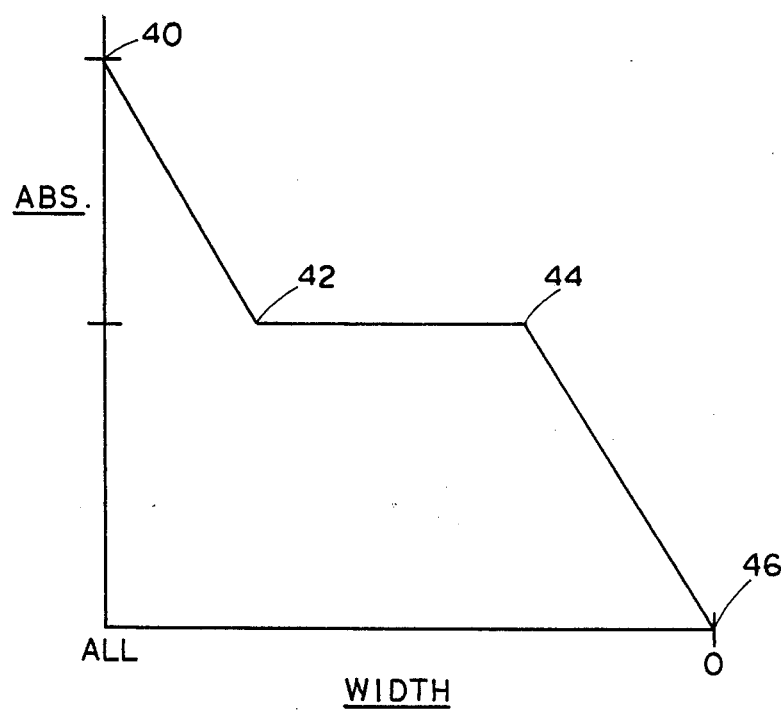
FIG. 7 is a plot of the absorbance per thickness of the article of FIG. 6.

Referring to FIG. 7, the absorbance of object 34 decreases from point 40 (at which point no grinding had occurred) to point 42 (at which point the entire darkened region 32 had been ground away). From point 42 until point 44 (at which point the entire undarkened region 34 had been ground away), the absorbance was substantially constant. From point 44 until point 46 (at which point the entire darkened region 36 had been ground away), the absorbance decreases.

The glass article produced by the process of this invention has non-linear absorbance. The term non-linear absorbance, as used in this specification, refers to the plot of absorbance versus article width (as shown in FIG. 7) when a glass article has its absorbance measured with light impinging upon a darkened surface of the article (as shown in FIG. 6), and the glass article is then periodically ground and its absorbance remeasured until its has substantially zero width (as shown in FIGS. 6 and 7). The plot of absorbance versus width, as one goes from 100 percent width to substially zero width, will be nonlinear, and thus the article has a non-linear absorbance.

The glass article of this invention has at least one darkened region whose absorbance is not a function of intensity of the light impinging upon it. This article is substantially different from photosensitive glasses, whose absorptive characteristics change with light intensity.

The following Examples are presented to illustrate the claimed invention but are not to be deemed limitative thereof. Unless otherwise specified, all parts are by weight, and all temperatures are in degrees Celsius.

EXAMPLE 1

The reagents used in this experiment, and in the other experiments of these Examples, were obtained from the Fisher Scientific Company of Pittsburgh, Pa. and are described in, e.g., the Fisher 88 catalog. The silica used in these examples was "silica, granular, fine", reagent number S150-3, page 198C. The boron oxide used was "boric anhydride (boron trioxide)", reagent A76-500, page 45C. The alumina used was "aluminum oxide, anhydrous powder", reagent number A591-500, page 25C, and potassium oxide used was "potassium carbonate, anhydrous powder," reagent number P208-500, page 182C, the antimony compound used was "antimony trioxide powder," reagent number A860-500, page number 34C, and the arsenic compound used was "aresenic trioxide, powder", reagent number A591-100, page 35C."

8.7009 grams of silica, 3.105 grams of boric oxide, 4.008 grams of potassium carbonate, 0.4548 grams of alumina, and 1.4575 grams of antimony trioxide were charged into a mortar and pestle and hand mixed for about 2 minutes. The mixture was then charged into a platinum crucible which was then placed into a preheated furnace (a bottom-loading Lindberg Hi-Temperature Crucible Furnace, model number 56724, Lindberg Company, Watertown, Wisconsin) which had been preheated to a temperature of 1500 degrees Celsius. The batch was then melted in the furnace by subjecting it to said temperature of 1500 degrees Celsius for 1 hour. Thereafter, the glass melt was removed from the furnance and allowed to cool in air to ambient temperature.

The cooled glass was removed from the crucible and annealed: The glass was charged to an annealing furnace (Fisher Isotemp Programmable Ashing Furnace, model number 497, Fisher Scientific, Pittsburgh, Pa.) and placed upon a refractory brick support in such furnace. The temperature of the annealing furnace was then raised from ambient to a temperature of 595 degrees Celsius over a period of about 150 minutes. Once the sample was at a temperature of 595 degrees Celsius, it was maintained at this temperature for 20 minutes. Thereafter, the glass was then cooled to 400 degrees Celsius at a rate of 1 degree Celsius per minute. After the sample had reached 400 degrees Celsius, it was cooled to ambient at a rate of 10 degrees Celsius per minute.

Four substantially rectangular slabs of about 1 centimeter × 2 centimeter × 1 millimeter size were cut from annealed sample on a low-speed diamond saw (Buehler Isomet Low Speed Saw, model #11-1180, Buehler Limited, Lake Bluff, Ill.). One of these samples was then placed into a vitreous silica tube 20 inches long×1.5 inches diameter which was equipped with a gas inlet, a vacuum line, a gas outlet, and a thermocouple. Once the sample was inserted into the silica tube, air was evacuated from the tube, the tube was filled with hydrogen, a pressure of 700 millimeters of mercury was imposed within the tube, and the tube was then inserted into a preheated tube furnace at a temperature of 600 degrees Celsius; and, once in the furnace, it was maintained at this temperature and such pressure for 8 hours.

The tube furnace was then removed from the silica tube, and the silica tube was then allowed to cool in air to ambient; cooling occured over a period of from about 5 to about 10 minutes. The cooled sample was then removed from the silica tube; it was observed to have undergone substantial darkening. The optical absorbance of the cooled sample was measured on a Varian ultra-violet visible near I.R. spectrophotometer (Varian UV-Vis-NIR Spectrophotometer, 2300 Series, Varian Instruments, Palo Alto, California); the measurements were conducted in accordance with Publication Number 87-175-111, Revision A682, available from Varian Instruments.

The optical absorbance of the cooled sample is shown below in Table 1 for different wavelengths. Tables 2 through 6 show the optical absorbances of samples produced under different conditions at different wavelengths. In Tables 1 and 4, the treatment conditions were 8 hours, 700 torr, and 600 degrees Celsius. In Tables 2 and 5, the treatment conditions were 4 hours, 700 torr, and 600 degrees Celsius. In Tables 3 and 6, the treatment conditions were 1 hour, 700 torr, and 600 degrees Celsius. In each of these tables, the term "Sb" refers to the batch mole percent concentration of antimony trioxide, and the term "As" refers to the batch mole percent concentration of arsenic trioxide.

EXAMPLE 2

The procedure of Example 1 was substantially followed, with the exception that, instead of using 1.4575 grams of antimony trioxide, 0.9892 grams of arsenic trioxide were used. The optical absorbances of the samples of this experiment are shown in Tables 1 through 6.

TABLE 1

| WAVELENGTH (nm) | ABSORBANCE | |
|---|---|---|
| | 2.07 Percent Sb (mol %) | 1.79 Percent As (mol %) |
| 1200 | 1.34 | 0.04 |
| 1100 | 1.60 | 0.06 |
| 1000 | 1.94 | 0.07 |
| 900 | 2.44 | 0.09 |
| 800 | 3.04 | 0.16 |
| 700 | 4.00 | 0.40 |
| 600 | 4.00 | 0.97 |
| 500 | 4.00 | 2.10 |
| 400 | 4.00 | 4.00 |
| 300 | 4.00 | 4.00 |
| 200 | 4.00 | 4.00 |

TABLE 2

| WAVELENGTH (nm.) | ABSORBANCE | |
|---|---|---|
| | 2.07 Percent Sb (mol %) | 1.79 Percent As (mol %) |
| 1200 | 0.92 | 0.04 |
| 1100 | 1.07 | 0.04 |
| 1000 | 1.29 | 0.06 |
| 900 | 1.60 | 0.08 |
| 800 | 2.06 | 0.12 |

TABLE 2-continued

| WAVELENGTH (nm.) | ABSORBANCE | |
|---|---|---|
| | 2.07 Percent Sb (mol %) | 1.79 Percent As (mol %) |
| 700 | 2.68 | 0.28 |
| 600 | 3.98 | 0.66 |
| 500 | 4.00 | 1.41 |
| 400 | 4.00 | 3.12 |
| 300 | 4.00 | 4.00 |
| 200 | 4.00 | 4.00 |

TABLE 3

| WAVELENGTH (nm.) | ABSORBANCE | |
|---|---|---|
| | 2.07 Percent Sb (mol %) | 1.79 Percent As (mol %) |
| 1200 | 0.40 | 0.07 |
| 1100 | 0.46 | 0.07 |
| 1000 | 0.54 | 0.08 |
| 900 | 0.65 | 0.08 |
| 800 | 0.82 | 0.10 |
| 700 | 1.05 | 0.16 |
| 600 | 1.46 | 0.32 |
| 500 | 2.32 | 0.65 |
| 400 | 4.00 | 1.38 |
| 300 | 4.00 | 4.00 |
| 200 | 4.00 | 4.00 |

TABLE 4

| WAVELENGTH (nm.) | ABSORBANCE | |
|---|---|---|
| | 1.05 Percent Sb (mol %) | 0.90 Percent As (mol %) |
| 1200 | 0.78 | 0.08 |
| 1100 | 0.91 | 0.08 |
| 1000 | 1.08 | 0.09 |
| 900 | 1.32 | 0.10 |
| 800 | 1.66 | 0.16 |
| 700 | 2.17 | 0.32 |
| 600 | 3.03 | 0.72 |
| 500 | 4.00 | 1.50 |
| 400 | 4.00 | 3.38 |
| 300 | 4.00 | 4.00 |
| 200 | 4.00 | 4.00 |

TABLE 5

| WAVELENGTH (nm.) | ABSORBANCE | |
|---|---|---|
| | 1.05 Percent Sb (mol %) | 0.90 Percent As (mol %) |
| 1200 | 0.53 | 0.08 |
| 1100 | 0.62 | 0.08 |
| 1000 | 0.72 | 0.08 |
| 900 | 0.89 | 0.08 |
| 800 | 1.12 | 0.12 |
| 700 | 1.47 | 0.22 |
| 600 | 2.05 | 0.52 |
| 500 | 3.30 | 1.09 |
| 400 | 4.00 | 2.34 |
| 300 | 4.00 | 4.00 |
| 200 | 4.00 | 4.00 |

TABLE 6

| WAVELENGTH (nm.) | ABSORBANCE | |
|---|---|---|
| | 1.05 Percent Sb (mol %) | 0.90 Percent As (mol %) |
| 1200 | 0.50 | 0.12 |
| 1100 | 0.57 | 0.12 |
| 1000 | 0.68 | 0.13 |
| 900 | 0.82 | 0.15 |
| 800 | 1.04 | 0.18 |
| 700 | 1.38 | 0.28 |
| 600 | 1.96 | 0.54 |
| 500 | 3.14 | 1.06 |

TABLE 6-continued

| WAVELENGTH (nm.) | ABSORBANCE | |
|---|---|---|
| | 1.05 Percent Sb (mol %) | 0.90 Percent As (mol %) |
| 400 | 4.00 | 2.24 |
| 300 | 4.00 | 4.00 |
| 200 | 4.00 | 4.00 |

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

Thus, by way of illustration and not limitation, one may prepare surface-darkened simple alkali silicate glasses, and/or surface-darkened alumino-silicate glasses, and/or surface-darkened soda-lime glasses by the process of this invention by using glass compositions with comparable amounts of antimony trioxide in them and contacting them with hydrogen-containing gas and heat in a similar manner.

We claim:

1. A process for preparing a surface-darkened glass, comprising the steps of sequentially:
   (a) providing an alkali alumino-borosilicate silicate glass comprised of from about 50 to about 85 weight percent of silica, from about 4 to about 26 weight percent of boron, from about 1 to about 26 weight percent of alumina, from about 0 to about 20 parts per million of silver ion, from about 0 to about 20 parts per million of halide ion, from about 0.2 to about 10.0 weight percent of antimony ion, and alkali, wherein said alkali is selected from the group consisting of from about 2 to about 8 weight percent of lithium oxide, from about 4 to about 15 percent of sodium oxide, from about 6 to about 20 weight percent of potassium oxide, from about 8 to about 25 weight percent of rubidium oxide, from about 10 to about 30 weight percent of cesium oxide, and mixtures thereof; and
   (b) subjecting said glass to a temperature of from about 350 to about 1,000 degrees Celsius for from at least about 30 minutes while contacting said glass with hydrogen-containing gas.

2. The process as recited in claim 1, wherein said hydrogen-containing gas is forming gas.

3. The process as recited in claim 1, wherein said hydrogen-containing gas is hydrogen.

4. The process as recited in claim 1, wherein from about 0.25 to about 10 liters of hydrogen per minute is flowed over said glass while said glass is heated at said temperature of from about 350 to about 1,000 degrees Celsius.

5. The process as recited in claim 4, wherein said glass is heated to a temperature of from about 400 to about 600 degrees centigrade while it is contacted with said hydrogen.

6. The process as recited in claim 5, wherein said glass is contacted with said hydrogen and heated to said temperature of from about 400 to about 600 degrees Celsius for at least about 2 hours.

7. The process as recited in claim 6, wherein said glass is contacted with said hydrogen and heated to said temperature of from about 400 to about 600 degrees Celsius for from about 2 to about 30 hours.

8. The process as recited in claim 1, wherein said glass is heated to said temperature of from about 350 to about 1,000 degrees Celsius while being contacted with said hydrogen-containing gas and being subjected to subatmospheric pressure.

9. The process as recited in claim 1, wherein said glass is heated to said temperature of from about 350 to about 1,000 degrees Celsius while being contacted with said hydrogen-containing gas and being subjected to atmospheric pressure.

10. The process as recited in claim 1, wherein said glass is heated to said temperature of from about 350 to about 1,000 degrees Celsius while being contacted with said hydrogen-containing gas and being subjected to superatmospheric pressure.

11. The process as recited in claim 1, wherein said glass is heated to said temperature of from about 350 to about 1,000 degrees Celsius while being contacted with said hydrogen-containing containing gas and being subjected to a pressure of from about 100 to about 5,000,000 torr.

12. The process as recited in claim 1, wherein said glass is heated to said temperature of from about 350 to about 1,000 degrees Celsius while being contacted with said hydrogen-containing gas and being subjected to a pressure of from about 700 to about 800 torr.

13. The process as recited in claim 3, wherein said glass is heated to a temperature of from about 400 to about 600 degrees Celsius while it is contacted with said hydrogen.

14. The process as recited in claim 13, wherein said glass is heated to said temperature of from about 400 to about 600 degrees Celsius for at least about 2 hours.

15. The process as recited in claim 14, wherein said glass is heated to said temperature of from about 400 to about 600 degrees Celsius for from about 2 to about 30 hours.

16. The process as recited in claim 15, wherein said glass is heated to said temperature of from about 400 to about 600 degrees Celsius while being subjected to atmospheric pressure.

17. The process as recited in claim 15, wherein said glass is heated to said temperature of from about 400 to about 600 degrees Celsius while being subjected to superatmospheric pressure.

18. The process as recited in claim 15, wherein said glass is heated to said temperature of from about 400 to about 600 degrees Celsius while being subjected to subatmospheric pressure.

19. The process as recited in claim 15, wherein said glass is heated to said temperature of from about 400 to about 600 degrees Celsius while being subjected to a pressure of from about 100 to about 5,000,000 torr.

20. The process as recited in claim 15, wherein said glass is heated to said temperature of from about 400 to about 600 degrees Celsius while being subjected to a pressure of from about 700 to about 800 torr.

* * * * *